(12) United States Patent
Greyzck et al.

(10) Patent No.: US 8,433,883 B2
(45) Date of Patent: Apr. 30, 2013

(54) INCLUSIVE "OR" BIT MATRIX COMPARE RESOLUTION OF VECTOR UPDATE CONFLICT MASKS

(75) Inventors: Terry D. Greyzck, Eagan, MN (US); William F. Long, St. Paul, MN (US); Peter M. Klausler, Madison, WI (US); Matthew F. Taylor, Detroit, MI (US)

(73) Assignee: Cray Inc., Seattle, WA (US)

( * ) Notice: Subject to any disclaimer, the term of this patent is extended or adjusted under 35 U.S.C. 154(b) by 770 days.

(21) Appl. No.: 12/482,618

(22) Filed: Jun. 11, 2009

(65) Prior Publication Data

US 2010/0318773 A1    Dec. 16, 2010

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC ........................................................ 712/223

(58) Field of Classification Search .................... 712/223
See application file for complete search history.

(56) References Cited

U.S. PATENT DOCUMENTS

| | | | |
|---|---|---|---|
| 4,392,198 A | 7/1983 | Shimazaki | |
| 4,710,872 A | 12/1987 | Scarborough | |
| 4,821,181 A | 4/1989 | Iwasawa et al. | |
| 4,833,606 A | 5/1989 | Iwasawa et al. | |
| 4,858,115 A | 8/1989 | Rusterholz et al. | |
| 4,967,350 A | 10/1990 | Maeda et al. | |
| 5,036,454 A | 7/1991 | Rau et al. | |
| 5,083,267 A | 1/1992 | Rau et al. | |
| 5,151,991 A | 9/1992 | Iwasawa et al. | |
| 5,170,370 A | 12/1992 | Lee et al. | |
| 5,247,696 A | 9/1993 | Booth | |
| 8,131,979 B2* | 3/2012 | Gonion et al. | 712/216 |
| 2006/0059196 A1 | 3/2006 | Sato et al. | |
| 2008/0288756 A1* | 11/2008 | Johnson et al. | 712/222 |
| 2010/0318591 A1 | 12/2010 | Long | |
| 2012/0072704 A1 | 3/2012 | Johnson et al. | |

FOREIGN PATENT DOCUMENTS

JP    63-120338    5/1988

OTHER PUBLICATIONS

Metzger et al., "APL thinking finding array-oriented solutions", 1981.*
"Matlab Communications Toolbox 4 Reference," (2002), pp. 2-66-2-72, 10 pages.
Chen, et al., "Zero-One Matricies," Obtained via http://cse.unl.edu/~bta/cse/cse235/tutorial/?cat=bool_product, (Nov. 1, 2004), 1 page.
Non-Final Office Action for U.S. Appl. No. 11/750,928, Date mailed Aug. 21, 2009,18 pages.
Response to Non-Final Office Action for U.S. Appl. No. 11/750,928, Date mailed Dec. 21, 2009, 11 pages.
Final Office Action for U.S. Appl. No. 11/750,928, Date mailed Mar. 25, 2010, 15 pages. Response to Final Office Action for U.S. Appl. No. 11/750,928, Date mailed May 25, 2010, 8 pages.

(Continued)

*Primary Examiner* — Corey S Faherty
(74) *Attorney, Agent, or Firm* — Perkins Coie LLP (57) ABSTRACT

A computer system is operable to identify index elements in a vector index array that cannot be processed in parallel by calculating a complement modified bit matrix compare function between a first matrix filled with elements from the vector index array and a second matrix filled with the same elements from the vector index array.

14 Claims, 4 Drawing Sheets

$$\begin{bmatrix} a_{11} & a_{12} & a_{13} & \ldots & a_{1n} \\ a_{21} & a_{22} & a_{23} & \ldots & a_{2n} \\ a_{31} & a_{32} & a_{33} & \ldots & a_{3n} \\ \vdots & \vdots & \vdots & & \vdots \\ a_{n1} & a_{n2} & a_{n3} & \ldots & a_{nn} \end{bmatrix} \text{ op } \begin{bmatrix} b_{11} & b_{21} & b_{31} & \ldots & b_{n1} \\ b_{12} & b_{22} & b_{32} & \ldots & b_{n2} \\ b_{13} & b_{23} & b_{33} & \ldots & b_{n3} \\ \vdots & \vdots & \vdots & & \vdots \\ b_{1n} & b_{2n} & b_{3n} & \ldots & b_{nn} \end{bmatrix} = \begin{bmatrix} r_{11} & r_{12} & r_{13} & \ldots & r_{1n} \\ r_{21} & r_{22} & r_{23} & \ldots & r_{2n} \\ r_{31} & r_{32} & r_{33} & \ldots & r_{3n} \\ \vdots & \vdots & \vdots & & \vdots \\ r_{n1} & r_{n2} & r_{n3} & \ldots & r_{nn} \end{bmatrix}$$

Multiply:
$r_{11} = a_{11} \bullet b_{11} \oplus a_{12} \bullet b_{12} \oplus \ldots \oplus a_{1n} \bullet b_{1n}$
$r_{12} = a_{11} \bullet b_{21} \oplus a_{12} \bullet b_{22} \oplus \ldots \oplus a_{1n} \bullet b_{2n}$
⋮
$r_{1n} = a_{11} \bullet b_{n1} \oplus a_{12} \bullet b_{n2} \oplus \ldots \oplus a_{1n} \bullet b_{nn}$
$r_{21} = a_{21} \bullet b_{11} \oplus a_{22} \bullet b_{12} \oplus \ldots \oplus a_{2n} \bullet b_{1n}$
⋮
$r_{nn} = a_{n1} \bullet b_{n1} \oplus a_{n2} \bullet b_{n2} \oplus \ldots \oplus a_{nn} \bullet b_{nn}$

⊕ = XOR
• = AND
+ = OR

Compare:
$r_{11} = a_{11} \bullet b_{11} + a_{12} \bullet b_{12} + \ldots + a_{1n} \bullet b_{1n}$
$r_{12} = a_{11} \bullet b_{21} + a_{12} \bullet b_{22} + \ldots + a_{1n} \bullet b_{2n}$
⋮
$r_{1n} = a_{11} \bullet b_{n1} + a_{12} \bullet b_{n2} + \ldots + a_{1n} \bullet b_{nn}$
$r_{21} = a_{21} \bullet b_{11} + a_{22} \bullet b_{12} + \ldots + a_{2n} \bullet b_{1n}$
⋮
$r_{nn} = a_{n1} \bullet b_{n1} + a_{n2} \bullet b_{n2} + \ldots + a_{nn} \bullet b_{nn}$

OTHER PUBLICATIONS

Non-Final Office Action for U.S. Appl. No. 11/750,928, Date mailed Aug. 11, 2010, 17 pages.
Response to Non-Final Office Action for U.S. Appl. No. 11/750,928, Date mailed Nov. 11, 2010, 8 pages.
Final Office Action for U.S. Appl. No. 11/750,928, Date mailed Jan. 19, 2011, 15 pages.
Response to Final Office Action for U.S. Appl. No. 11/750,928, Date mailed Apr. 21, 2011, 9 pages.
Non-Final Office Action for U.S. Appl. No. 13/020,358, Date mailed Aug. 16, 2012, 8 pages.
Non-Final Office Action for U.S. Appl. No. 11/750,928, Date mailed Jun. 30, 2011, 18 pages.

* cited by examiner $$[a_1 \ a_2 \ a_3 \ \ldots \ a_n] \ \text{op} \ \begin{bmatrix} b_{11} & b_{21} & b_{31} & \ldots & b_{n1} \\ b_{12} & b_{22} & b_{32} & \ldots & b_{n2} \\ b_{13} & b_{23} & b_{33} & \ldots & b_{n3} \\ \ldots & \ldots & \ldots & \ldots & \ldots \\ b_{1n} & b_{2n} & b_{3n} & \ldots & b_{nn} \end{bmatrix} = [r_1 \ r_2 \ r_3 \ \ldots \ r_n]$$

$\oplus$ = XOR
$\bullet$ = AND
$+$ = OR

Multiply:

$r_1 = a_1 \bullet b_{11} \oplus a_2 \bullet b_{12} \oplus \ldots \oplus a_n \bullet b_{1n}$ $r_2 = a_1 \bullet b_{21} \oplus a_2 \bullet b_{22} \oplus \ldots \oplus a_n \bullet b_{2n}$ $r_n = a_1 \bullet b_{n1} \oplus a_2 \bullet b_{n2} \oplus \ldots \oplus a_n \bullet b_{nn}$ Compare:

$r_1 = a_1 \bullet b_{11} + a_2 \bullet b_{12} + \ldots + a_n \bullet b_{1n}$ $r_2 = a_1 \bullet b_{21} + a_2 \bullet b_{22} + \ldots + a_n \bullet b_{2n}$ $\ldots$ $r_n = a_1 \bullet b_{n1} + a_2 \bullet b_{n2} + \ldots + a_n \bullet b_{nn}$

*Fig. 1*

$$\begin{bmatrix} a_{11} & a_{12} & a_{13} & \ldots & a_{1n} \\ a_{21} & a_{22} & a_{23} & \ldots & a_{2n} \\ a_{31} & a_{32} & a_{33} & \ldots & a_{3n} \\ \vdots & \vdots & \vdots & & \vdots \\ a_{n1} & a_{n2} & a_{n3} & \ldots & a_{nn} \end{bmatrix} \text{op} \begin{bmatrix} b_{11} & b_{21} & b_{31} & \ldots & b_{n1} \\ b_{12} & b_{22} & b_{32} & \ldots & b_{n2} \\ b_{13} & b_{23} & b_{33} & \ldots & b_{n3} \\ \vdots & \vdots & \vdots & & \vdots \\ b_{1n} & b_{2n} & b_{3n} & \ldots & b_{nn} \end{bmatrix} = \begin{bmatrix} r_{11} & r_{12} & r_{13} & \ldots & r_{1n} \\ r_{21} & r_{22} & r_{23} & \ldots & r_{2n} \\ r_{31} & r_{32} & r_{33} & \ldots & r_{3n} \\ \vdots & \vdots & \vdots & & \vdots \\ r_{n1} & r_{n2} & r_{n3} & \ldots & r_{nn} \end{bmatrix}$$

Multiply:

$r_{11} = a_{11} \bullet b_{11} \oplus a_{12} \bullet b_{12} \oplus \ldots \oplus a_{1n} \bullet b_{1n}$ $r_{12} = a_{11} \bullet b_{21} \oplus a_{12} \bullet b_{22} \oplus \ldots \oplus a_{1n} \bullet b_{2n}$ $\vdots$ $r_{1n} = a_{11} \bullet b_{n1} \oplus a_{12} \bullet b_{n2} \oplus \ldots \oplus a_{1n} \bullet b_{nn}$ $r_{21} = a_{21} \bullet b_{11} \oplus a_{22} \bullet b_{12} \oplus \ldots \oplus a_{2n} \bullet b_{1n}$ $\vdots$ $r_{nn} = a_{n1} \bullet b_{n1} \oplus a_{n2} \bullet b_{n2} \oplus \ldots \oplus a_{nn} \bullet b_{nn}$ $\oplus$ = XOR
$\bullet$ = AND
$+$ = OR Compare:

$r_{11} = a_{11} \bullet b_{11} + a_{12} \bullet b_{12} + \ldots + a_{1n} \bullet b_{1n}$ $r_{12} = a_{11} \bullet b_{21} + a_{12} \bullet b_{22} + \ldots + a_{1n} \bullet b_{2n}$ $\vdots$ $r_{1n} = a_{11} \bullet b_{n1} + a_{12} \bullet b_{n2} + \ldots + a_{1n} \bullet b_{nn}$ $r_{21} = a_{21} \bullet b_{11} + a_{22} \bullet b_{12} + \ldots + a_{2n} \bullet b_{1n}$ $\vdots$ $r_{nn} = a_{n1} \bullet b_{n1} + a_{n2} \bullet b_{n2} + \ldots + a_{nn} \bullet b_{nn}$

INCLUSIVE "OR" BIT MATRIX COMPARE RESOLUTION OF VECTOR UPDATE CONFLICT MASKS

FIELD OF THE INVENTION

The invention relates generally to computer instructions, and more specifically to using an inclusive "OR" bit matrix compare instruction to resolve vector update conflict masks.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data movement instructions.

Arithmetic instructions include common math functions such as add and multiply. Logic instructions include logical operators such as AND, NOT, and invert, and are used to perform logical operations on data. Data movement instructions include instructions such as load, store, and move, which are used to handle data within the processor.

Data movement instructions can be used to load data into registers from memory, to move data from registers back to memory, and to perform other data management functions. Data loaded into the processor from memory is stored in registers, which are small pieces of memory typically capable of holding only a single word of data. Arithmetic and logical instructions operate on the data stored in the registers, such as adding the data in one register to the data in another register, and storing the result in one of the two registers or in a third register.

A variety of data types and instructions are typically supported in sophisticated processors, such as operations on integer data, floating point data, and other types of data in the computer system. Because the various data types are encoded into the data words stored in the computer in different ways, adding the numbers represented by two different words stored in two different registers involves different operations for integer data, floating point data, and other types of data.

For these and other reasons, it is desirable to carefully consider the data types and instructions supported in a processor's register and instruction set.

SUMMARY

A computer system is operable to identify index elements in a vector index array that cannot be processed in parallel by calculating a complement modified bit matrix compare function between a first matrix filled with elements from the vector index array and a second matrix filled with the same elements from the vector index array.

BRIEF DESCRIPTION OF THE FIGURES

FIG. 2 shows a vectorized bit matrix compare instruction, consistent with some embodiments of the invention.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

Sophisticated computer systems often use more than one processor to perform a variety of tasks in parallel, use vector processors operable to perform a specified function on multiple data elements at the same time, or use a combination of these methods. Vector processors and parallel processing are commonly found in scientific computing applications, where complex operations on large sets of data benefit from the ability to perform more than one operation on one piece of data at the same time. Vector operations specifically can perform a single function on large sets of data with a single instruction rather than using a separate instruction for each data word or pair of words, making coding and execution more straightforward. Similarly, address decoding and fetching each data word or pair of data words is typically less efficient than operating on an entire data set with a vector operation, giving vector processing a significant performance advantage when performing an operation on a large set of data.

The actual operations or instructions are performed in various functional units within the processor. A floating point add function, for example, is typically built in to the processor hardware of a floating point arithmetic logic unit, or floating point ALU functional unit of the processor. Similarly, vector operations are typically embodied in a vector unit hardware element in the processor which includes the ability to execute instructions on a group of data elements or pairs of elements. The vector unit typically also works with a vector address decoder and other support circuitry so that the data elements can be efficiently loaded into vector registers in the proper sequence and the results can be returned to the correct location in memory.

Operations that are not available in the hardware instruction set of a processor can be performed by using a combination of the instructions that are available to achieve the same result, typically with some cost in performance. For example, multiplying two numbers together is typically supported in hardware, and is relatively fast. If a multiply instruction were not a part of a processor's instruction set, available instructions such as shift and add can be used as a part of the software program executing on the processor to compute a multiplication, but will typically be significantly slower than performing the same function in hardware.

One example embodiment of the invention seeks to speed up operation of a certain type of vector function by incorporating hardware support for an instruction to perform the function in the instruction set. An example of such a vector function is performing an operation on a multi-dimensional array representing the physical state of a system, such as modeling nuclear reactions, modeling weather, modeling the ocean, and other such scientific computing applications. Arrays representing the state of various points in the environment being modeled are operated on using various functions to model the impact of outside forces, changes in temperature or other conditions, and similar characteristics.

Functions such as these are typically executed using vector instructions, such that different elements of the array can be operated on in parallel in a processor, greatly reducing the time needed to complete such computation. A loop of the form:

```
do i=1,n
    x(i)=x(i)+y(i)
end do
``` operates on two arrays, adding the elements of an array y to the array x, storing the result in array x. As the loop variable i proceeds from a value of one to the final value determined by the value of n, the corresponding numbered elements of the arrays x and y are added together, and the resulting element overwrites the initial value stored in element i of array x. Such a loop can be easily vectorized, or processed in parallel, because each element of the array x can be processed separately from each other element of the array.

A more complex loop of the form:

```
do i=1,n
    x(ix(i))=x(ix(i))+y(i)
end do
``` operates on the various elements of the vector x, which are identified by the loop variable i and the index array ix. More specifically, as the loop variable i proceeds from one to n as the loop is processed, each value of i references a value in the index array ix. Although the loop variable proceeds from one to n in whole numbers, the index value referenced may repeat, reusing some elements of the array x. This causes data dependencies, such that the values calculated as a result of some operations on certain elements of array x are dependent on the operations on the same element in a previous iteration of the loop. This data dependency makes vectorizing or parallelizing such a loop difficult, in that such data dependencies generally need to be identified and managed before the loop can be processed as a vector.

In a more detailed simplified example, consider that n has a value of 8, and the index values from 1 to 8 are (1, 2, 3, 1, 4, 5, 1, 6). Here, the first element of array x is operated on three separate times in the loop, when the value of i is one, four, and seven. In order to properly vectorize this loop, the order of the operations on array element 1 should be maintained, while the remaining elements can be processed independently and in any order.

To achieve this, a vector mask is utilized, identifying those elements of the index ix that cannot be vectorized, allowing the remaining elements to be easily identified and included in a vector such that the elements can be processed in parallel. In the previous example, the mask for values of i would be (1, 0, 0, 1, 0, 0, 1, 0), where a value of one identifies indexed elements that are masked or cannot be vectorized, but should be processed in sequence as required by the data dependency. The mask in a further example can be used to split a vector that cannot be processed in parallel up into sub-vectors that can be processed in parallel, such as elements 1-3 and elements 4-6. While these sub-vectors are relatively small in this simplified example, larger sub-vector sizes can provide significant gains over sequential processing of an indexed loop such as the one above.

In some systems, hardware memory systems or vector registers are used to identify such data dependencies, adding significant cost and complexity to the memory system and vector processing units. Some embodiments of the present invention avoid this design complexity by using a bit matrix compare instruction to identify repeated values in an index such as ix of the above loop example, generating a vector update conflict mask that can be used to mask elements of a vector that cannot be parallelized or to find sub-vectors that can be processed in parallel in a larger vector that has data dependencies preventing parallelization.

The bit matrix compare operation is a hardware instruction that uses the OR function as the addition operation of a bit matrix multiplication, which can be used as the key operation in a sequence of operations to compare each element of a matrix or array with the other elements of the matrix or array.

Figure 1:
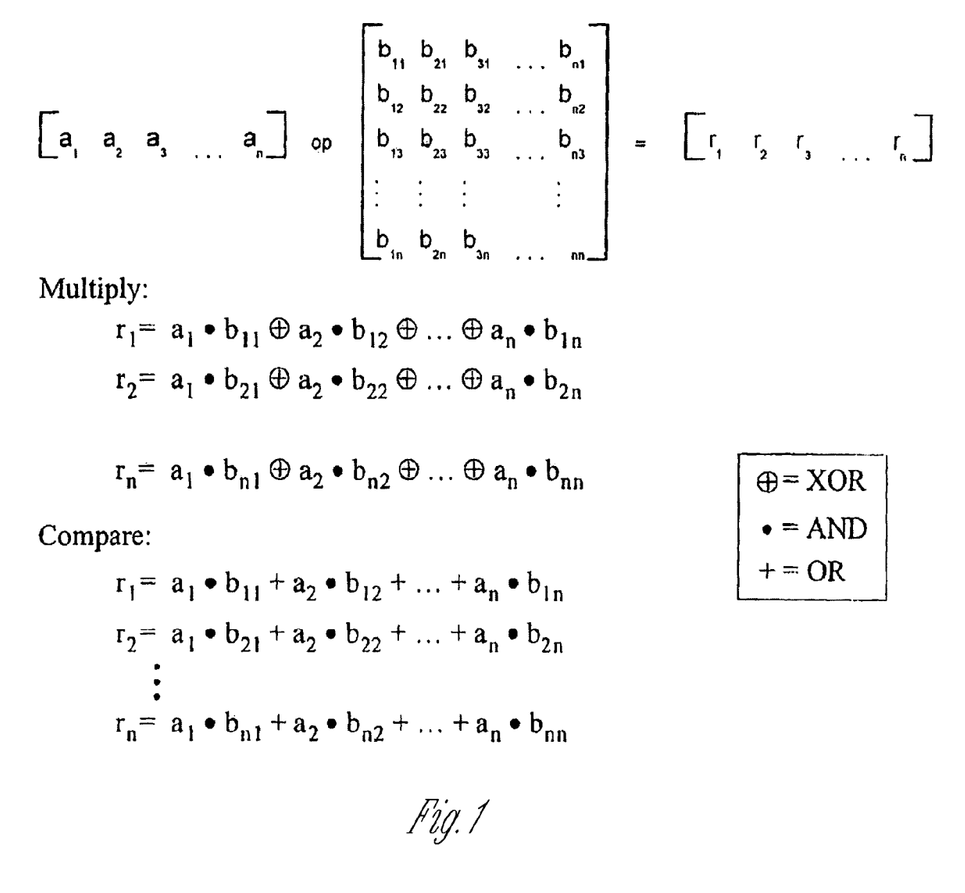
FIG. 1 shows a bit matrix compare instruction, consistent with an example embodiment of the invention.

In one more detailed example shown in FIG. 1, a series of 1×64 bit data elements in a 64×64 bit matrix A is bit matrix compared to 1×64 bit data elements in a second 64×64 bit matrix B, and the result is given by 64×64 bit result matrix R. In this example, the bits of matrix B are transposed before the AND and OR operations are performed on the matrix elements.

The equations used to compare the rows of matrix A to the columns of transposed matrix B are also shown in FIG. 1, which illustrates by example how to calculate several result matrix elements. As the compare result equations indicate, the first element of the result vector r1 indicates whether element a1 and b11 are the same, or whether a2 and b12 are the same, and so on. The result string therefore represents in each of its specific bit elements whether any of the elements of string a and corresponding elements of a specific column of matrix b are both one.

This compare operation can be extended to operate on two vectors, as shown in FIG. 2. Here, vector bit matrix compare function is shown, in which a bit matrix a is vector bit matrix compared to a bit matrix b, and the result is shown in bit matrix r. The equations used to calculate the elements of the result matrix are also shown in FIG. 2, and illustrate that the various elements of the result matrix indicate whether any of the elements of a given row of matrix a and any elements of a given column of matrix b are both one in value.

Figure 3:
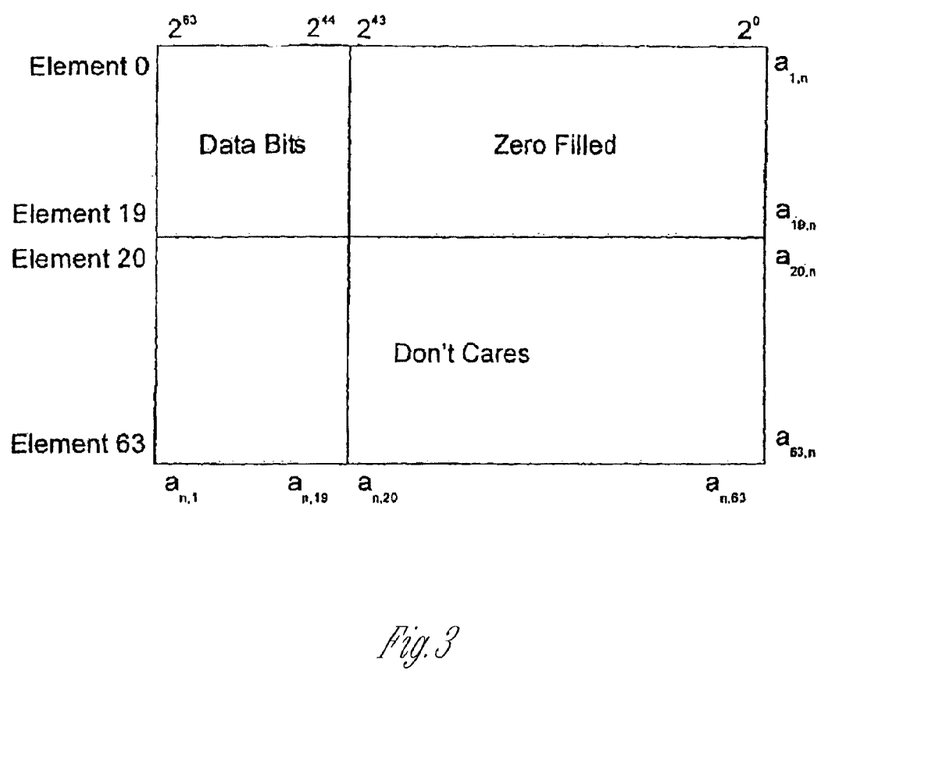
FIG. 3 shows loading a bit matrix register "a" with a data set smaller than the array size, consistent with some embodiments of the invention.

In some further embodiments, arrays or matrix arrays of a given capacity are used to store data sets of a smaller capacity. FIG. 3 shows an example in which a bit matrix register a with a 64-bit capacity is filled with a 20-bit matrix, and the rest of the elements are filled with either zeros or with values that do not matter in calculating the final result matrix. The vector bit matrix compare result register therefore also contains a matrix of the same 20-bit size, with the remaining bits not a part of the result.

For a set of 1×64 bit data elements, identify a subset of 32 of the elements with the name L and the remaining subset of 32 elements with the name R. One possible example of these subsets would be to consider the original 64 elements in a row and assign the left 32 elements to the subset L and the right 32 elements to the subset R. However, any division of the elements between the subsets L and R is equally valid as long as the union of the L and R subsets is the original set of 64, and the intersection of the L and R subsets is empty. The LRC function is a mapping of the 32 bits of an integer value onto the L subset of a set of 64 bit data elements, and the 32 bits of the one's complement of the same integer value onto the R subset of that same set of 64 bit data elements. The one's complement of the integer value is the value with each one bit changed to zero and each zero bit changed to one. The LCR function is a mapping similar to the LRC function except that the integer value is mapped onto the R subset and the one's complement of the integer is mapped to the L subset of the 64 bit data elements. The LRC function result can be computed by first computing the LCR function result and then forming the one's complement each of the elements.

The application of the LRC function to an integer M and the LCR function to an integer N has the following properties. If the values of M and N are the same then in every corresponding location of the two function results, one of the bits will be a one and the other will be a zero. Thus, the bit matrix compare of these two results is zero. If the values of M and N are not the same, then they have at least one corresponding bit that is one in M and zero in N, or is zero in M and one in N. As a consequence, in at least one case the corresponding elements of the results of applying the LRC and LCR functions to M and N respectively will both be one. Thus, the bit matrix compare of these two results is one. The combination of applying the LCR function to one integer value, the LRC function to another integer value and the performing a bit matrix compare operation on the results is referred to as the "complement modified bit matrix compare function".

The vector bit matrix function illustrated in FIGS. 2 and 3 can be used with data elements, such as the index values of ix(i) in the loop example above, and those data elements compared using the complement modified bit matrix compare function. Continuing the example above, assume that the matrix a of FIG. 2 is loaded with up to 64 elements of the results of applying the LCR function to index ix(i), with one element in each row, such that row 1 holds the bits of index word 1, row 2 holds the bits of index word 2, and so on. Similarly, the matrix b is loaded with one element of the matrix in each column, such that column 1 holds the bits comprising the result of applying the LRC function to index word 1, column 2 holds the bits of index word 2, and so on.

The complement modified bit matrix compare function compares each row of matrix a with each column of matrix b, storing a value in the corresponding element of the result matrix If the corresponding row from matrix a and column from matrix b held identical values, the result stored in the result matrix will be a zero. Otherwise, it will be one.

The result matrix can therefore be searched for zeros, such that each zero indicates either that an index element was compared with itself or was compared with another index element having an identical value. For example, the result elements, at r(1,1), r(2,2) . . . r(n,n) should all be zero, indicating that the index value stored in each row of matrix a is identical to the same index value stores in the same numbered column of matrix b. If the first and second elements of the index are identical, both r(2,1) and r(1,2) should be zero, indicating that both times these elements were compared with one another in the bit matrix compare operation, they were found to be identical.

Figure 4:
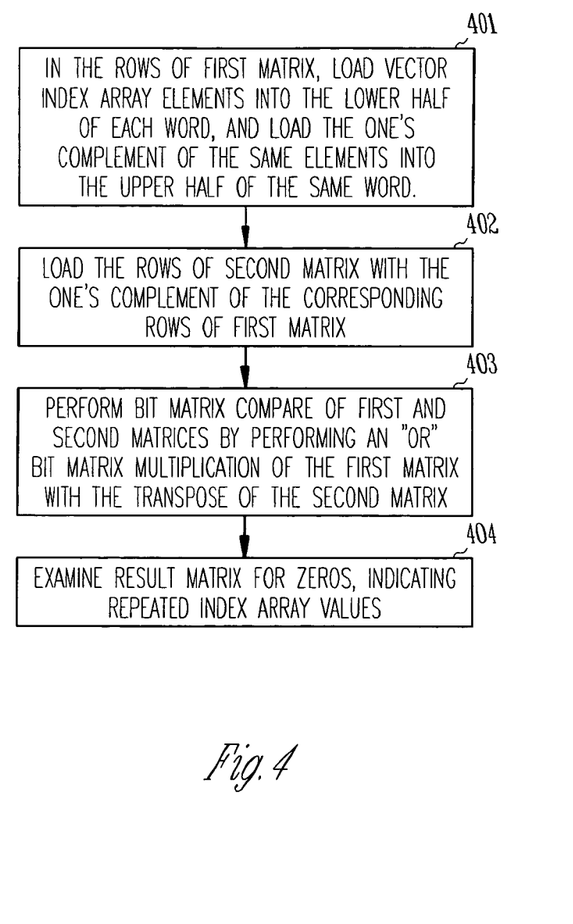
FIG. 4 is a flowchart of a method of identifying elements in a vector index array that cannot be processed in parallel by using a vector bit matrix compare instruction, consistent with an example embodiment of the invention.

The flowchart of FIG. 4 illustrates an example method using the bit matrix compare instruction to identify and find the location of repeated elements. At 401, the first of two matrices has its rows loaded with data computed from the elements of a vector index array. The lower 32 bits of each row is loaded with the corresponding element from the vector index array and the upper 32 bits of the row is loaded with the one's complement of the same vector index array element. At 402 the second matrix has its rows loaded with the one's complement of the corresponding rows of the first matrix. In practice it does not which of the first and second matrices is loaded with the vector index array data and which is the one's complement of the other.

At 403, the bit matrix compare operation described in greater detail above is performed on the two matrices. The result matrix is examined at 404, to determine which matrix elements are zero, indicating that the vector index array elements used to load those matrix rows are the same.

Any index element that is repeated in the loop can therefore be masked, such that it is excluded from vector parallelization when a loop such as that in the example presented above is parallelized. In a further embodiment, the location of identical elements in the loop index can be observed, and subvectors of elements lying between the identical elements can be vectorized or parallelized without having to mask certain elements from parallelization.

The bit matrix compare functions described herein can be implemented into the hardware functional units of a processor, such as by use of hardware logic gate networks or microcode designed to implement logic such as the equations shown in FIGS. 1 and 2. Because the bit matrix compare function is implemented in hardware, it can be executed using only a single processor instruction rather than the dozens or hundreds of instructions that would normally be needed to implement the same function on a 64-bit matrix in software. The instruction can then be used such as by using it in combination with other instructions to determine the number of bits by which a particular set of data differ from another, the location and number of elements that repeat, and similar such functions.

The vector and scalar bit matrix compare instructions implemented in hardware in processors therefore enable users of such processors to perform these functions significantly faster than was previously possible in software, including to identify repeated values in an array or matrix such as in a vector index array. When evaluating index values for a loop, such as in the example above, the bit matrix compare function compares each element against the other elements of the index array, indicating which elements are the same as which other elements in the index vector.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A multiprocessor computer system, comprising:
 a plurality of processors; and
 a vectorization module operable to enable a processor to identify index elements in a vector index array that cannot be processed in parallel by calculating a complement modified bit matrix compare function between a first matrix filled with elements from the vector index array and a second matrix filled with the same elements from the vector index array.

2. The multiprocessor computer system of claim 1, the vectorization module further operable to:
- parallelize at least a portion of the vector index array that can be processed in parallel; and
- sequentially process the elements of the vector index array that cannot be processed in parallel.

3. The multiprocessor computer system of claim 1, the vector module further operable to mask the elements of the vector index array that cannot be processed in parallel from a parallelization process.

4. The multiprocessor computer system of claim 1, the vector module further operable to process sub-vectors from within the vector index array wherein the sub-vector comprises sequential index elements that can be processed in parallel.

5. The multiprocessor computer system of claim 1, wherein the bit matrix compare function is a vector hardware instruction in a computer processor.

6. The multiprocessor computer system of claim 1, wherein calculating a bit matrix compare function comprises:
- loading a first matrix with vector index array elements loaded in one of either columns or rows;
- loading a second matrix with vector index array elements loaded in the other of either columns or rows; and
- computing a result array by calculating a complement modified bit matrix compare function of the first and second matrices.

7. The multiprocessor computer system of claim 1, wherein the vectorization module comprises hardware, software, or a combination thereof.

8. A method performed by a vectorization module of a computer system with a processor, the method comprising:
- identifying index elements in a vector index array that cannot be processed in parallel by calculating a complement modified bit matrix compare function between a first matrix filled with elements from the vector index array and a second matrix filled with the same elements from the vector index array.

9. The method of claim 8 including:
- parallelizing at least a portion of the vector index array that can be processed in parallel; and
- sequentially processing the elements of the vector index array that cannot be processed in parallel.

10. The method of claim 8 including masking the elements of the vector index array that cannot be processed in parallel from a parallelization process.

11. The method of claim 8 including processing sub-vectors from within the vector index array wherein the sub-vector comprises sequential index elements that can be processed in parallel.

12. The method of claim 8 wherein the bit matrix compare function is a vector hardware instruction in a computer processor.

13. The method of claim 8 wherein the calculating a bit matrix compare function comprises:
- loading a first matrix with vector index array elements loaded in one of either columns or rows;
- loading a second matrix with vector index array elements loaded in the other of either columns or rows; and
- computing a result array by calculating a complement modified bit matrix compare function of the first and second matrices.

14. The method of claim 8 wherein the vectorization module comprises hardware, software, or a combination thereof.

* * * * *

UNITED STATES PATENT AND TRADEMARK OFFICE
CERTIFICATE OF CORRECTION

PATENT NO. : 8,433,883 B2
APPLICATION NO. : 12/482618
DATED : April 30, 2013
INVENTOR(S) : Greyzck et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this
Thirtieth Day of September, 2014

Michelle K. Lee
*Deputy Director of the United States Patent and Trademark Office*